United States Patent [19]

Sohn

[11] 4,262,383

[45] Apr. 21, 1981

[54] WINDOW-WIPING DEVICE FOR DOUBLE HEADLIGHTS ON MOTOR VEHICLES

[75] Inventor: Mireille Sohn, Houilles, France

[73] Assignee: Regie Nationale des Usines Renault, Houilles, France

[21] Appl. No.: 101,168

[22] Filed: Dec. 7, 1979

[30] Foreign Application Priority Data

Aug. 12, 1978 [FR] France .................................. 78 34615

[51] Int. Cl.³ .............................................. B60S 1/28
[52] U.S. Cl. ............................. 15/250.14; 15/250 A;
15/250.27; 15/250.34
[58] Field of Search ............ 15/250.14, 250.13, 250 A,
15/250.16, 250.27, 200.3, 250.34, 250.35

[56] References Cited

U.S. PATENT DOCUMENTS 3,825,971  7/1974  Ursel et al. ......................... 15/250 A

FOREIGN PATENT DOCUMENTS 2245192  4/1975  France ................................... 15/250 A
848577   9/1960  United Kingdom .................. 15/250 A

*Primary Examiner*—Peter Feldman
*Attorney, Agent, or Firm*—Oblon, Fisher, Spivak, McClelland & Maier

[57] ABSTRACT

A device for wiping the windows of double headlights on a motor vehicle, which includes two wipers angularly spread out and set in motion in accordance with an alternative circular movement on a joint motor shaft located inside a zone included between two neighboring headlights characterized in that one of the wipers is directly set in motion by the shaft on the tip of which it is mounted, whereas the other wiper is set in motion by way of a delayed coupling mounted on the joint shaft in such a way as to provide a delay in its motion and therefore to reduce its wiping range in relation to the range of the first wiper.

6 Claims, 4 Drawing Figures

WINDOW-WIPING DEVICE FOR DOUBLE HEADLIGHTS ON MOTOR VEHICLES

BACKGROUND OF THE INVENTION

1. Field of the Invention

The present invention relates generally to a wiping device for the windows on headlights of a motor vehicle and more particularly, on windows of doubled headlights separately ensuring functions of headlights and dipped or low beam headlights.

2. Description of the Prior Art

In the case of doubled headlights placed side by side, either substantially in the same plane, or in slightly inclined planes within the axle of the vehicle, wiping devices are known in which the wipers of each headlight are activated simultaneously by an identical alternative angular movement from a joint motor shaft located in a zone included between the two headlights of a same couple.

In the case of two headlights located in shifted planes, it is known that each window-wiping arm is set in motion by each tip of a spacer locked onto the shaft, so that the displacement between the arms corresponds with the displacement between the windows.

When the vacuum is filled, which exists in the vicinity between the headlights, for esthetic reasons, with the help of an escutcheon made of plastic and/or insignias surrounding the headlights, one must avoid, especially if the external curved surface of the windows is slightly embedded into the escutcheon, the wipers stumbling against the sides of these surrounding parts, by applying trims in such parts so as not to encumber the wiper and reduce the wiping range, which is already affected by the pronounced curvature of the headlight-wipers.

SUMMARY OF THE INVENTION

For the purpose of reducing the trims applied to the surrounding parts (escutcheon, insignias), or even suppressing them entirely, at least in the case of one of the headlights, this invention offers a window-wiping device for double headlights with a wiper drive from a joint motor shaft, in which the clearance, and therefore the wiping range, of one of the wipers is lesser than the clearance of the other wiper.

This result is obtained by the fact that the shaft, which also sets the wiper of the "standard sweep" into direct drive, sets the wiper of the "reduced sweep" by way of a delaying coupling comprised of two parts mounted on the shaft, one of which may have a lug which first engages in free travel within the curvilinear port of the other part, before setting the latter into rotation.

The angular hop of the lug within the port corresponds with the delay in the drive of the delayed wiper and thus with the difference between the wiping ranges of the two respective wipers.

Such a device is of interest if one maintains the standard sweep for the projectors of the headlights, the function of which is deemed a priority for safety reasons, and of which the useful surface of the window is greater than that of the dipped headlights.

With respect to the latter, one can be content with reduced wiping, where the wipers, which are tightly bent, do not exceed the window surface at the end of the sweep, which precisely avoids the above-mentioned trims.

BRIEF DESCRIPTION OF THE DRAWINGS

Other features and attendant advantages of the present invention will be more fully appreciated as the same becomes better understood from the following detailed description, when considered in connection with the accompanying drawings, in which.

DETAILED DESCRIPTION OF THE ILLUSTRATED EMBODIMENT

Figure 1:
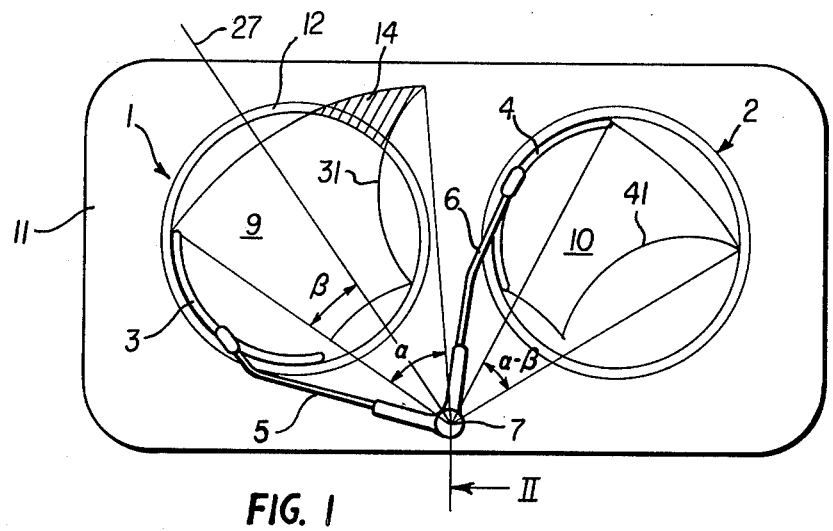
FIG. 1 is a schematic front view which depicts the uneven wiping ranges of the wiping device formed according to the present invention.

Referring now to FIG. 1, seen from the front of the vehicle, a pair of projectors or headlights, one of which, 1, on the left, is assigned to the headlight and the other of which 2, on the right, is kept for the dipped headlight.

The projectors are equipped with a device for wiping windows comprised mainly of two wipers 3, 4 tightly bent so as to embrace, in their illustrated resting position, the silhouette of the circular projectors, being driven by two arms 5, 6 mounted on a joint motor shaft 7 located in a zone included between the two neighboring projectors. The motor transmits to the wipers a conventional alternative circular movement.

In accordance with the invention, the first wiper 3 (or its arm) is driven directly by the shaft 7 on which it is locked to perform an angular sweep $\alpha$, whereas the second wiper 4 is driven by way of a delaying coupling 8 mounted on the joint shaft 7 so that its start can be triggered when the first wiper 3 has already performed the travel $\beta$ and reducing, therefore, its wiping range at a corresponding angular value $\beta$ in relation to the range $\alpha$ of the first wiper.

As one can see in FIG. 1, if the tip of the wiper 3 of the dipped or low beam headlight overflows at the end of the sweep 31 of the window surface 9, on the other hand, the wiper of the headlight projector remains inside 41 of the window surface 10, which first of all avoids an additional trim to be carried out on the surrounding parts, such as the escutcheon 11 or the insignia 12, or the planning of a withdrawn curve in the parts inside the striped zone 14.

Figure 2:
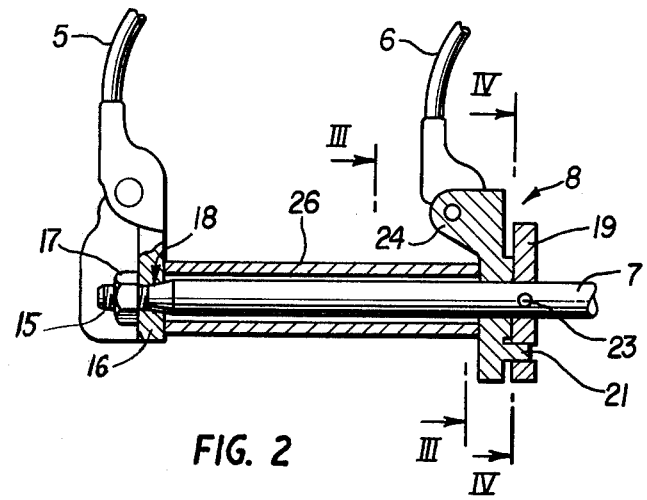
FIG. 2 is a cross-sectional view taken along line 2—2 of FIG. 1 of the drive system of the wipers.

FIG. 2 shows the drive of arms 5, 6 of the wipers, brought back inside the same plane for better clarity.

The wiper 3 on arm 5 of the headlight projector is shown in direct drive on the tip of the motor arm 7, equipped in this case with a threaded head 15 crossing the flange 16 and tightened by a nut 17. The lock is obtained by squeezing a conic reduction 18 of the shaft into a corresponding bore of the flange 16.

The other wiper 4 on arm 6, described as delayed, is mounted on the joint shaft by way of a coupling 8 made of two adjacent parts, one of which 19 attached to the shaft in both rotation and translation, drives the other, 20, which is assembled freely around the shaft 7, with a lug 21 thereof being received in a curvilinear port 22 of the part 19.

Figure 4:
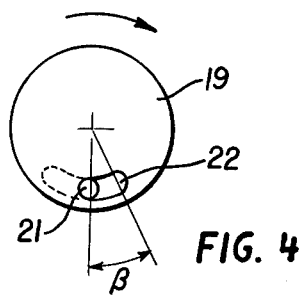

The depicted embodiment, serving as an illustration, uses for the first time the bush part 19 (FIG. 4), secured at 23 onto the shaft and including a curvilinear port 22 which is concentric on the axle, of which the angular length corresponds with the delay in the drive and the predefined reduction of the sweeping range.

Figure 3:
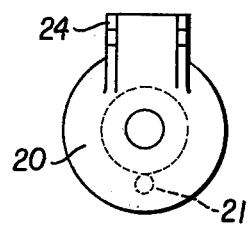
FIGS. 3 and 4 show the two parts of the delaying coupling, seen respectively along lines 3—3 and 4—4 of FIG. 2.

The second part of the coupling (FIG. 3) is another bush 20 which bears the lug 21 engaging itself into the port of the first part, and also has a wing or tread portion 24 for assembling the articulation of the delayed wiper 4.

The part 20, which supports the delayed wiper, is sustained in a translation motion onto the shaft 7, between the wedged bush 19 and the flange of the wiper in direct drive, although maintaining a weak longitudinal play to preserve the free rotation of the part 20 around the shaft.

As depicted in FIG. 2, it is possible to intersperse between the two wipers, while respecting the preceding play 25, a tubular spacer 26, fitted on the shaft, of a length corresponding to the displacement ultimately present between the windows of the two projectors 1, 2 in the axle of the vehicle.

The operation of the device is simple. Starting from the rest position of the two wipers in FIG. 1, when the motor shaft 7 performs the "go" phase of its alternative movement, the "direct" wiper 3 is driven immediately, as well as the bush 19, which pivots in a β angle which corresponds to the curvilinear length of its port 22.

When the port arrives on the lug 21 in a thrust-like manner (broken line position of FIG. 4), which corresponds to the position 27 of the wiper 3 (FIG. 1), the coupling achieved between the two bushes triggers the drive of the "delayed" wiper 4, which then ends its sweep at the same time as the first wiper.

Thus, when the shaft 7 and the "direct" wiper 3 clear an angular motion α, the delayed wiper 4 clears an angular motion of (α−β), in conformity with the invention.

The return phase of the movement of the shaft performs the same functions, but in the reverse order.

The invention is not restricted to the depicted embodiment, but encompasses all basic technical equivalencies which lead to an identical result, especially in regard to the delayed coupling, of which the port and lug can be worn indiscriminately by either one of the bushes present. Accordingly, many modifications and variations are possible in light of the above teachings. It is therefore to be understood that within the scope of the appended claims, the invention may be practiced otherwise than as specifically described herein.

What is claimed as new and desired to be secured by Letters Patent of the United States is:

1. In a device for wiping the windows of double headlights on a motor vehicle, characterized by two angularly displaced wipers driven according to an alternative circular movement on a joint motor shaft located in a zone included between the two neighboring headlights, the improvement comprising:
    one of said wipers being mounted on the end of said shaft and being directly driven thereby;
    the other of said wipers being freely mounted on said shaft in spaced relation from said one of said wipers; and
    a delaying coupling mounted on said shaft and engaged with said other of said wipers so as to trigger a delay for the setting in motion of the said other of said wipers and reduce its sweeping range in relation to the range of the said one of said wipers.

2. A device according to claim 1, wherein said delaying coupling comprises two adjacent parts, a first being one attached to said shaft in rotation and translation and drivingthe second part by way of a lug hopping in a curvilinear port of a given angular value which corresponds to the predefined reduction of the sweeping range of the said one of said wipers.

3. A device according to claim 2, wherein said first part of the coupling is wedged onto the shaft and includes the curvilinear port and said second part is equipped with the lug which engages itself into the port and includes a tread for the articulated assembly of the delayed wiper.

4. A device according to any of claim 2 or 3, wherein the part which supports the delayed wiper is freely mounted around the motor shaft and is translationally maintained on this shaft, with a weak play between the first part of the coupling and a flange of the direct drive wiper locked at the tip of the shaft.

5. A device according to claim 4, wherein the two wipers are displaced in the direction of the motor shaft by way of a spacer which is assembled around the shaft with translational play.

6. A device according to claim 1, wherein the direct drive wiper is reserved for wiping the headlight projector, whereas the delayed wiper is reserved for wiping the dipped headlight projector.

* * * * *